(12) United States Patent
Ennemark et al.

(10) Patent No.: US 12,012,160 B2
(45) Date of Patent: Jun. 18, 2024

(54) FLUID CONTROLLER, IN PARTICULAR AS PART OF A HYDRAULIC STEERING UNIT

(71) Applicant: Danfoss Power Solutions ApS, Nordborg (DK)

(72) Inventors: Poul Ennemark, Sønderborg (DK); Abdul Karim Rahimzai, Sønderborg (DK); Nils E. Sevelsted, Sønderborg (DK)

(73) Assignee: DANFOSS POWER SOLUTIONS APS, Nordborg (DK)

( * ) Notice: Subject to any disclaimer, the term of this patent is extended or adjusted under 35 U.S.C. 154(b) by 626 days.

(21) Appl. No.: 17/191,186

(22) Filed: Mar. 3, 2021

(65) Prior Publication Data
US 2021/0284227 A1 Sep. 16, 2021

(30) Foreign Application Priority Data
Mar. 10, 2020 (DE) .......................... 102020106437.3

(51) Int. Cl.
*B62D 5/065* (2006.01)
*B62D 5/087* (2006.01)
*B62D 5/12* (2006.01)

(52) U.S. Cl.
CPC ............. *B62D 5/065* (2013.01); *B62D 5/087* (2013.01); *B62D 5/12* (2013.01)

(58) Field of Classification Search
CPC .............................. B62D 5/065; B62D 5/097
See application file for complete search history.

(56) References Cited

U.S. PATENT DOCUMENTS

| | | | |
|---|---|---|---|
| 2,798,461 | A | 7/1957 | Gold et al. |
| 2,827,976 | A | 3/1958 | Brand |

(Continued)

FOREIGN PATENT DOCUMENTS

| | | |
|---|---|---|
| CN | 1174148 A | 2/1998 |
| CN | 1179517 A | 4/1998 |

(Continued)

OTHER PUBLICATIONS

First Examination Report for Indian Serial No. 202114001805 dated Feb. 10, 2022.

(Continued)

*Primary Examiner* — Reinaldo Sanchez-Medina
*Assistant Examiner* — Nicole Gardner
(74) *Attorney, Agent, or Firm* — McCormick, Paulding & Huber PLLC

(57) ABSTRACT

A fluid controller (1), in particular as part of a hydraulic steering unit, is described, said controller (1) comprising a housing (2) having a supply port arrangement, a sleeve (4) arranged rotatably in a bore of the housing (2), a spool (3) arranged rotatably in the sleeve (4), and a measuring motor, wherein the measuring motor comprises a plurality of working chambers, each working chamber being connected to the bore, wherein the sleeve (4) comprises a commutation geometry (7) having a number of pairs of commutation grooves (12, 13) and controlling together with a housing geometry (5) of the housing (2) a flow of hydraulic fluid into and out of the working chambers and the spool (3) comprises a spool geometry controlling together with a valve geometry of the sleeve (4) a flow of hydraulic fluid between the supply port arrangement and the commutation geometry. Such a fluid controller should have a stable control behaviour. To this end at least one of the commutation grooves (12, 13) comprise a closed bottom and at least one of the commu- (Continued)

tation grooves (12, 13) comprise a throughgoing opening (10, 11) forming part of the valve geometry.

20 Claims, 3 Drawing Sheets

(56) References Cited

U.S. PATENT DOCUMENTS

| | | | |
|---|---|---|---|
| 2,984,215 A | 5/1961 | Charlson | |
| 3,528,521 A | 9/1970 | Ellis | |
| 3,658,449 A | 4/1972 | Woodling | |
| 3,739,577 A | 6/1973 | Nagase et al. | |
| 3,801,239 A | 4/1974 | Larson | |
| 3,805,838 A | 4/1974 | Christensen | |
| 3,819,307 A | 6/1974 | Uppal | |
| 3,937,601 A | 2/1976 | Miller | |
| 3,964,371 A | 6/1976 | Wagner et al. | |
| 4,174,612 A | 11/1979 | Liebert | |
| 4,270,349 A | 6/1981 | Ljubimov et al. | |
| 4,311,171 A | 1/1982 | Roberts | |
| 4,409,789 A | 10/1983 | Hansen et al. | |
| 4,452,274 A | 6/1984 | Haga et al. | |
| 4,671,747 A | 6/1987 | Arbjerg | |
| 4,711,315 A | 12/1987 | Kitamura | |
| 4,923,170 A | 5/1990 | Takaoka et al. | |
| 4,934,911 A | 6/1990 | Schulz | |
| 5,101,860 A | 4/1992 | Stephenson | |
| 5,273,072 A | 12/1993 | Phillips | |
| 5,435,698 A | 7/1995 | Phillips | |
| 5,505,119 A | 4/1996 | Phillips | |
| 5,701,970 A | 12/1997 | Arbjerg | |
| 5,725,023 A | 3/1998 | Padula | |
| 5,730,040 A | 3/1998 | Strong | |
| 5,845,736 A | 12/1998 | Bohner et al. | |
| 6,182,786 B1 | 2/2001 | Rom | |
| 6,237,331 B1 | 5/2001 | Sorensen | |
| 6,318,078 B1 | 11/2001 | Novacek et al. | |
| 6,769,451 B2 | 8/2004 | Hjelsand | |
| 6,863,147 B2 | 3/2005 | Catellani | |
| 7,364,006 B2 | 4/2008 | Birsching et al. | |
| 7,610,935 B2 | 11/2009 | Arbjerg | |
| 9,211,907 B2 | 12/2015 | Kubo et al. | |
| 2003/0006087 A1 | 1/2003 | Sahr et al. | |
| 2003/0006097 A1 | 1/2003 | Sahr et al. | |
| 2006/0075747 A1 | 4/2006 | Shiina et al. | |
| 2011/0283694 A1 | 11/2011 | Smith et al. | |
| 2012/0097471 A1 | 4/2012 | Sakamaki et al. | |
| 2018/0009471 A1 | 1/2018 | Novacek | |
| 2018/0105203 A1 | 4/2018 | Takenaka et al. | |
| 2019/0031233 A1 | 1/2019 | Bergmann et al. | |
| 2020/0108862 A1 | 4/2020 | Pippes et al. | |

FOREIGN PATENT DOCUMENTS

| | | |
|---|---|---|
| CN | 1189134 A | 7/1998 |
| CN | 1260305 A | 7/2000 |
| CN | 1997541 A | 7/2007 |
| CN | 101970277 A | 2/2011 |
| CN | 104024088 A | 9/2014 |
| DE | 2015897 A1 | 10/1971 |
| DE | 2906183 A1 | 8/1980 |
| DE | 4204336 A1 | 8/1993 |
| DE | 4241036 C1 | 4/1994 |
| DE | 102006026394 A1 | 2/2007 |
| EP | 2610139 A1 | 3/2013 |
| FR | 1495400 A | 9/1967 |
| GB | 1342503 | 1/1974 |
| JP | S50-4731 U | 1/1975 |
| JP | 59230864 | 12/1984 |
| KR | 970041001 | 7/1997 |
| KR | 2006-0061663 A | 6/2006 |
| KR | 20080010529 | 1/2008 |
| WO | 03093089 | 11/2003 |
| WO | 2008069552 | 6/2008 |

OTHER PUBLICATIONS

First Examination Report for Indian Serial No. 202114002243 dated Feb. 11, 2022.

First Examination Report for Indian Serial No. 202114002244 dated Jan. 18, 2022.

Office Action issued for Chinese Patent Application No. 202110181366.3, dated May 30, 2023 and its English translation.

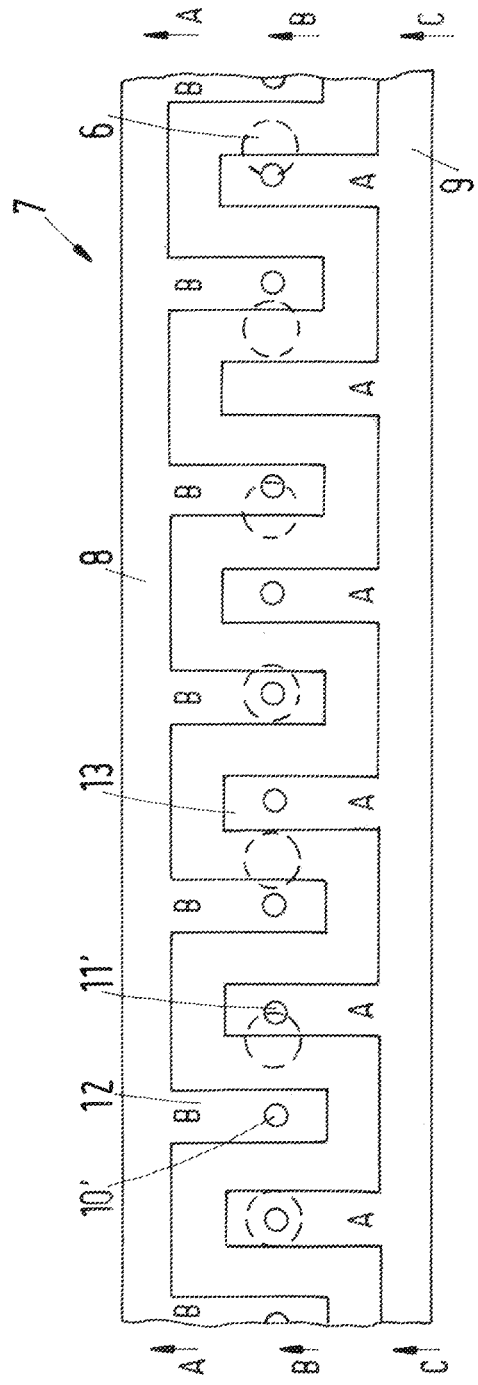
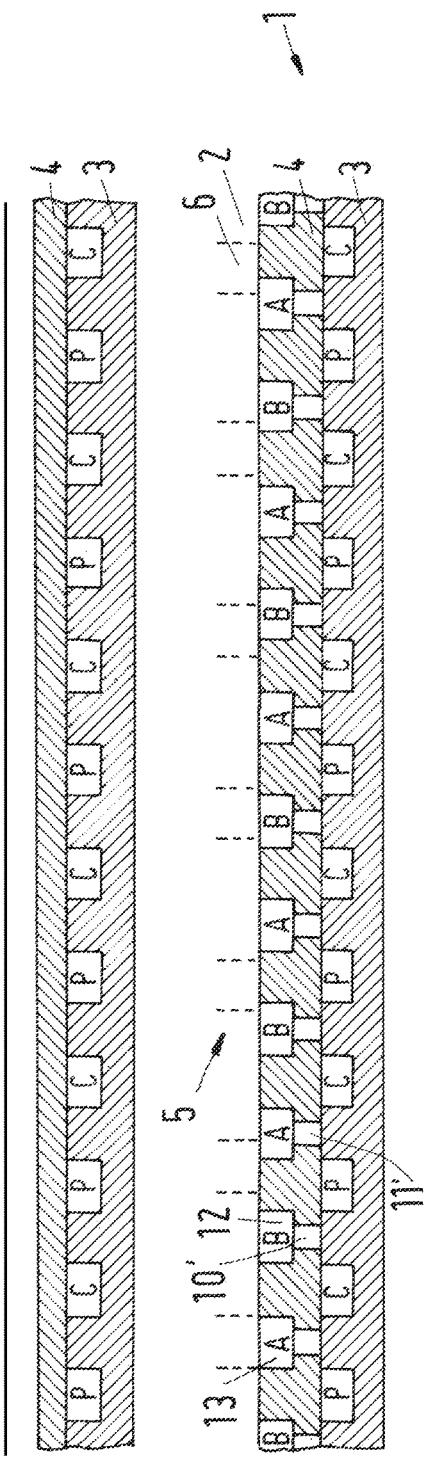
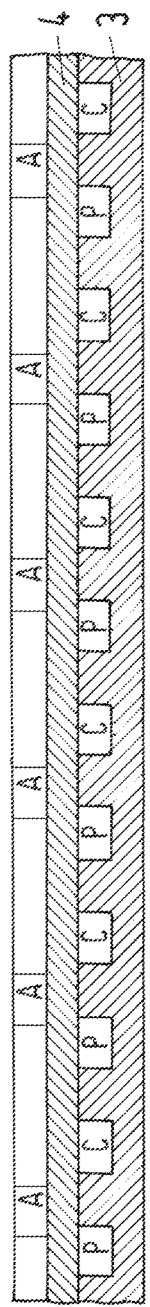
Fig.1a Fig.1b Fig.1c Fig.1d

FLUID CONTROLLER, IN PARTICULAR AS PART OF A HYDRAULIC STEERING UNIT

CROSS-REFERENCE TO RELATED APPLICATION

This application claims foreign priority benefits under 35 U.S.C. § 119 to German Patent Application No. 102020106437.3 filed on Mar. 10, 2020, the content of which is hereby incorporated by reference in its entirety.

TECHNICAL FIELD

The present invention relates to a fluid controller, in particular as part of a hydraulic steering unit, said controller comprising a housing having a supply port arrangement, a sleeve arranged rotatably in a bore of the housing, a spool arranged rotatably in the sleeve, and a measuring motor, wherein the measuring motor comprises a plurality of working chambers, each working chamber being connected to the bore, wherein the sleeve comprises a commutation geometry having a number of pairs of commutation grooves and controlling together with a housing geometry of the housing a flow of hydraulic fluid into and out of the working chambers and the spool comprises a spool geometry controlling together with a valve geometry of the sleeve a flow of hydraulic fluid between the supply port arrangement and the commutation geometry.

BACKGROUND

Such a fluid controller is known, for example, from U.S. Pat. No. 7,610,935 B2.

In the following a steering unit is used as example for such a fluid controller. However, the invention is not limited to a steering unit.

A steering unit is used to supply a certain amount of a hydraulic fluid to a steering motor or steering actuator which is connected to the steering unit. The steering unit in turn is connected to a steering wheel or another steering command means. When the steering wheel is rotated, the spool is rotated in relation to the sleeve. This rotation opens orifices which are formed by the spool geometry and the valve geometry. The fluid passing these orifices is supplied to the commutation geometry which in turn supplies the fluid via the housing geometry to the working chambers of the measuring motor. The measuring motor can be, for example, a gerotor motor or gear set having a number of working chambers. Each working chamber is connected to a section of the housing geometry.

The fluid arriving at the measuring motor drives the measuring motor. The measuring motor is connected to the sleeve and restores the sleeve to an initial position once the necessary amount of fluid has been supplied to the steering motor. The fluid driving the measuring motor is supplied to the steering motor.

SUMMARY

An object of the invention is to achieve a stable control behaviour.

This object is solved with a fluid controller as described at the outset in that at least one of the commutation grooves comprise a closed bottom and at least one of the commutation grooves comprise a throughgoing opening forming part of the valve geometry.

In order to facilitate the explanation of the invention, an example is used in which the measuring motor is a gerotor motor comprising a star wheel having six outer teeth and a star ring having seven inner teeth. Accordingly, the measuring motor comprises seven working chambers. Each working chamber is connected to the bore of the housing via a channel, the channel ending in an opening in the bore and the openings together form the housing geometry.

In the prior art the sleeve comprises six pairs of commutation grooves Thus, the commutation geometry has a partition of six. The spool comprises likewise six pairs of bores having likewise a partition of six. The spool is supplied with hydraulic fluid under pressure in one axial half and return hydraulic fluid to the tank or another low-pressure region in the other axial half of the spool.

When the spool is rotated in relation to the sleeve, for example, when a steering wheel is rotated, orifices are opened to allow a fluid to pass from the spool to the sleeve and from there to the housing and vice versa from the housing through the sleeve to the spool.

Since there are six pairs of bores in the sleeve and the same number of bores in the spool and the spool can be rotated in both directions in relation to the sleeve, there is a maximum angle of rotation of 30°, i.e. 15° in each direction of rotation.

The small angle or relative rotation between the spool and the sleeve bears the risk of an unstable control behaviour.

According to the invention, this risk can be substantially reduced. The possible rotation between sleeve and spool is no longer or to a lesser extent limited by the commutation geometry.

In an embodiment of the invention the spool geometry comprises a set of supply areas connected to a supply port of the supply port arrangement and a set of cylinder areas connected to a cylinder port of the housing, wherein a number of the supply areas is equal to a number of the cylinder areas and smaller than the number of the pairs of commutation grooves. According to the invention it is possible to use different partitions or partition angles for the commutation geometry on the one hand and for the valve geometry on the other hand. The partition angle is the width of each partition in circumferential direction. Accordingly, the spool can be rotated in relation to the sleeve independently of the partition angle of the commutation geometry, so that the limitation of the angle of rotation is no longer a bar for the stability of the control behaviour of the fluid controller.

In an embodiment of the invention in circumferential direction supply areas and cylinder areas are separated by sealing areas, wherein the width of each sealing area is larger than a width of the throughgoing openings. In this way the sealing areas can be used to close the throughgoing openings. When the throughgoing openings are closed, there is no flow of hydraulic fluid to the measuring motor.

In an embodiment of the invention in circumferential direction the width of the sealing area is smaller than or equal to a width of the commutation grooves. A throughgoing opening is usually somewhat smaller than the commutation groove. The sealing area is only slightly larger than the width of the throughgoing opening in circumferential direction. Thus, only a small rotation of the spool in relation to the sleeve is necessary to initiate the steering operation. The dead band is small.

In an embodiment of the invention the supply area comprises a supply groove connected to the supply port, wherein a flow resistance decreases from a border of the supply area to the supply groove and/or the cylinder area comprises a cylinder groove connected to a cylinder port, wherein a flow resistance increases from the cylinder groove to a border of the supply area. When the spool is rotated in relation to the sleeve, the border of the supply area and the border of the cylinder area, respectively, start passing the throughgoing opening. At this stage the flow resistance is high. The flow resistance decreases the more the spool is rotated in relation to the sleeve. This has the advantage that the steering operation is smooth. There is no sudden pressure increase which could be sensed by the driver at the steering wheel.

In an embodiment of the invention the supply area and/or the cylinder area comprise a section varying in circumferential direction. There are a number of possibilities to achieve such a varying section. One possibility is to have an inclined bottom of the supply area and the cylinder area, respectively. Another possibility is to increase an axial length of the supply area or cylinder area, respectively, from the border of the supply area or the cylinder area, respectively, to the respective supply groove or cylinder groove. It is also possible to form at least a part of the supply area and/or the cylinder area in the radially inner side of the sleeve.

In an embodiment of the invention the interior of the sleeve does not form part of a connection between the valve geometry and the commutation geometry. The sleeve can be closed to the radially inner side in the region of the commutation geometry.

In an embodiment of the invention the partition angle of the commutation geometry is 45° or less. It is accordingly possible to use the commutation geometry for control of a measuring motor having five or more working chambers. The commutation geometry can be the partition angle known from the prior art, for example, the above-mentioned 30°. However, it is possible to use a larger partition angle for the valve geometry.

In an embodiment of the invention, the partition angle of the valve geometry is 60° or more. Accordingly, a stable control behaviour can be achieved.

In an embodiment of the invention the partition angle of the valve geometry is 90°. This has two advantages. On the one hand, a rather large rotation is allowed between the spool and the sleeve. On the other hand, the pressure distribution on the spool and the sleeve can be balanced, so that the risk of deformation of spool and sleeve is quite small.

BRIEF DESCRIPTION OF THE DRAWINGS

An embodiment of the invention will now be described in more detail with reference to the drawing, wherein:

FIG. 1a shows a schematic illustration of a fluid controller according to the prior art, FIG. 1b shows a section A-A of FIG. 1a, FIG. 1c shows a section B-B of FIG. 1a, FIG. 1d shows a section C-C of FIG. 1a, FIG. 2a shows a schematic illustration of a fluid controller according to the invention.

DETAILED DESCRIPTION

Figure 3:
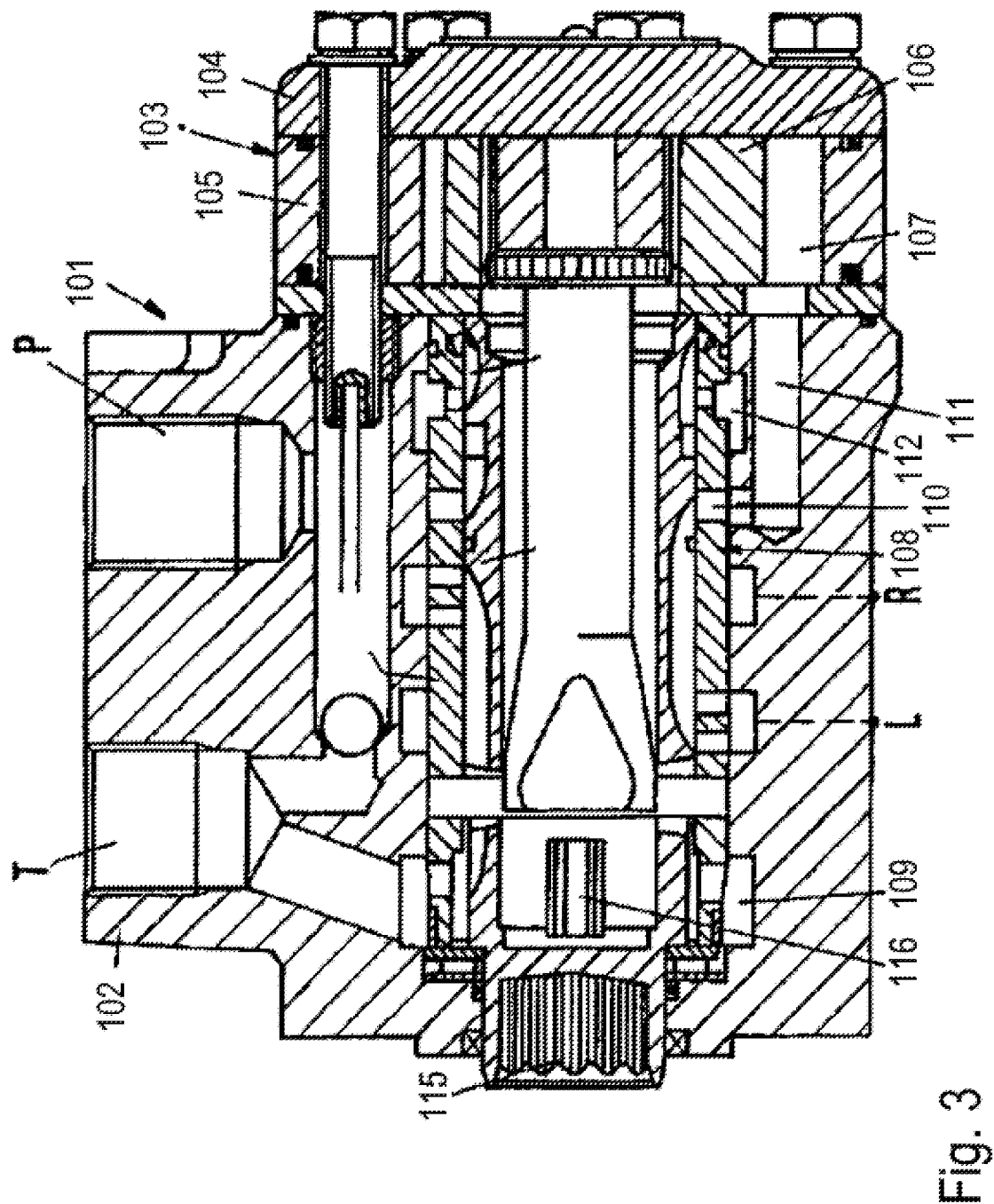

FIG. 3 illustrates a control device 101 comprising a housing 102, a fluid meter 103, and an end plate 104. The inlet P is connected to a pump and the outlet T is connected to a system reservoir from which the pump receives the fluid. The control ports are not visible in the shown cross section but the letters L and R point at annular chambers to which the control ports are in communication. The fluid meter 103 comprises a stationary gear ring 105 (or star ring) having internal teeth, and a rotating and planetary gear 106 (or star wheel) having external teeth. The gears form volume chambers 107 which expand and contract during the movement of the external teeth between the internal teeth.

A valve member 108 is rotatably disposed in the housing in which an annular chamber 109 is in communication with the outlet T. L is connected to one end of a steering cylinder and R is connected to the other end of the steering cylinder via control ports which as aforementioned are not shown in the FIG. L and R form working ports or direction ports. A plurality of meter ports 10 provided in the valve member 108 communicate between the volume chambers 107 via the axial passages 111 which are provided in the housing. The annular chamber 112 is in communication with the inlet P and thereby with the fluid under pressure delivered by the pump.

The valve member 108 comprises a sleeve 113 and a spool 114. The spool comprises a coupling end 115 which is driven by the operator of a vehicle via a drive wheel. The spool and the sleeve can be turned relatively to each other through a predetermined angle in both directions out of a neutral position against the force of radial leaf springs 116. The planetary gear 106 and thereby the displacement of the fluid out of the chambers of the fluid meter is driven by the sleeve via a pin and a cardan shaft 117 connected between the sleeve and the planetary gear. When the resistance against the displacement of the fluid exceeds the rigidity of the spring 116, the sleeve starts to slip and rotates relative to the spool whereby the spool moves from the neutral configuration to an operating configuration whereby the valve member establishes a passage between the inlet P and one of the control ports (L, R) and between the other control port and the outlet T, respectively.

FIG. 1 shows schematically some parts of a fluid controller 1 according to the prior art. The fluid controller 1 comprises in a way known a housing 2, a spool 3 and a sleeve 4. The sleeve 4 is rotatably arranged in the housing 2 and the spool 3 is rotatably arranged in the spool 4.

The housing 2 comprises a housing geometry 5 having a number of bores 6 which are arranged in the inner circumferential wall of a bore of the housing 2 which accommodates the sleeve 4.

In order to show and distinguish different pressures, characters C and P are used. P represents the supply pressure, i.e. a pressure at a pressure port. C represents a "cylinder pressure", i.e. a pressure at a working port or direction port, which port is connected to a steering motor or steering actuator.

Characters A, B represent pressures in working chambers of a measuring motor (not shown). In the present example the fluid controller 1 comprises a measuring motor having seven working chambers which are formed between a star wheel having six outer teeth and a star ring having seven inner teeth. Each of the working chambers is connected to one of the bores 6. Accordingly, it is possible to supply the working chambers with hydraulic fluid under pressure (for example pressure A) and to return hydraulic fluid from the working chambers to the housing geometry 5 (for example pressure B).

The sleeve 4 comprises a commutation geometry 7. The commutation geometry 7 is in form of a surface structure on the radially outer surface of the sleeve 4. The commutation geometry 7 is connected to a first groove 8 running in circumferential direction and a second groove 9 running in circumferential direction as known. The first groove 8 is connected to throughgoing openings 10' and the second groove 9 is connected to throughgoing openings 11', wherein the openings 10' are arranged in six commutation grooves 12 which are connected to the first groove 8 and the second openings 11' are arranged in second commutation grooves 13 which are connected to the second groove 9. The first commutation grooves 12 and the second commutation grooves 13 extend perpendicular from the circumferential grooves 8, 9 at least to an axial position, in which the bores 6 of the housing geometry 5 are arranged, however, the commutation grooves 12, 13 extend in opposite axial direction.

FIG. 1*b* is a section A-A of FIG. 1*a*, FIG. 1*c* is a section B-B of FIG. 1*a* and FIG. 1*d* is a section C-C of FIG. 1*a*. FIG. 1*b* to 1*d* show the set of spool 3 and sleeve 4 in neutral positions. The openings 10', 11' are closed by the spool 3.

As mentioned above, the first commutation grooves 12 and the second commutation grooves 13 form the commutation geometry 7. Depending on the positions of the first and second commutation grooves 12, 13 in relation to the openings 6, some of the working chambers of the measuring motor are supplied with hydraulic fluid under pressure, whereas other chambers return hydraulic fluid. The openings 10', 11' form a valve geometry. The length of the first opening 10' is equal to the length of the second opening 11' in circumferential direction.

The spool 3 comprises a spool geometry having a supply area P connected to a pressure port of the housing 2 and a cylinder area C connected to a working port of the housing 2 so that it is able to supply fluid to a cylinder or receive it from the cylinder.

The connection between the supply area P and the cylinder area C to the pressure source or the working port, respectively, can be made in different ways. One possibility is to divide the interior of the spool 3 in axial direction in a high-pressure chamber and in a cylinder pressure chamber and to connect the supply area P to the high-pressure chamber and the cylinder area C to the cylinder pressure chamber. Other supply and return solutions are possible.

Usually, the pressure area P and the cylinder area C are formed by grooves.

When the spool 3 is moved in relation to a sleeve 4 to the righthand side (directions relate to the view shown in FIG. 1*b* to 1*d*, then the openings 11' come in overlapping relation with grooves P in the spool 3 whereas the other openings 10' come in overlapping relation with grooves C. Thus, the commutation grooves 12, 13 have different pressures which are transmitted via the commutation geometry 7 to the working chambers of the measuring motor.

In the embodiment shown in FIG. 2, some modifications have been made.

Figure 2A:
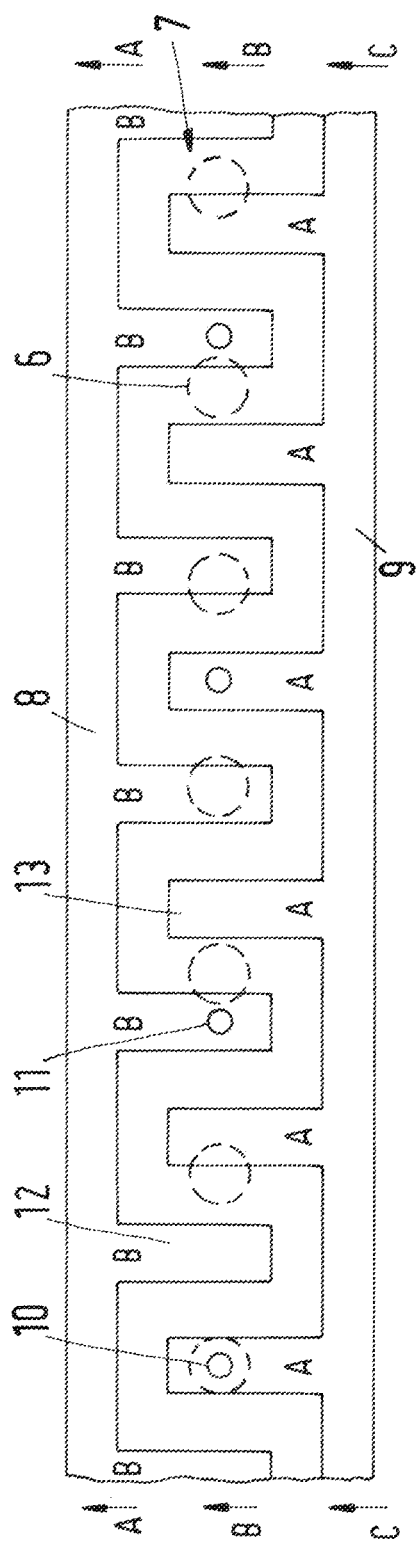
FIG. 2b shows a sectional view A-A of FIG. 2a, FIG. 2c shows a sectional view B-B of FIG. 2a, FIG. 2d shows a sectional view C-C of FIG. 2a, and FIG. 3 shows a schematically a fluid controller in a sectional view.
Figure 2B:
Figure 2C:
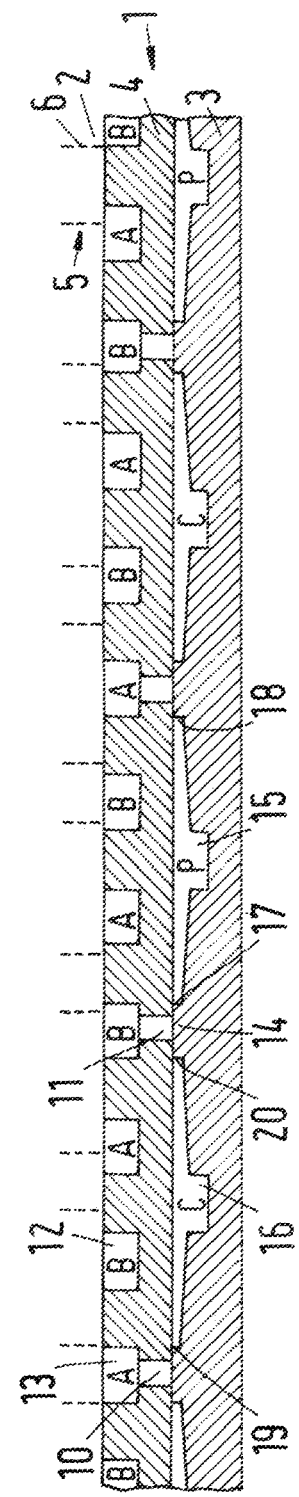
Figure 2D:
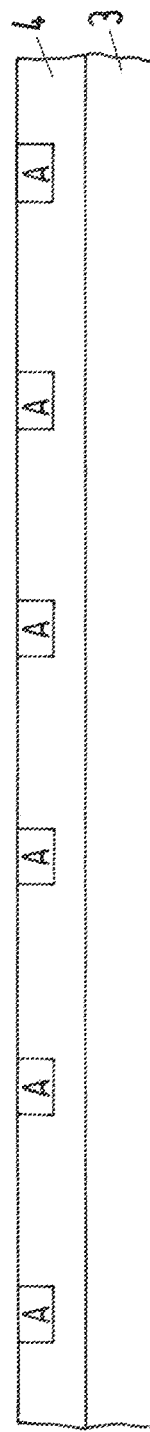

Again, FIG. 2*b* shows a sectional view A-A of FIG. 2*a*, FIG. 2*c* shows a sectional view B-B of FIG. 2*a*, and FIG. 2*d* shows a sectional view C-C of FIG. 2*a*. FIG. 2*b*-2*d* show the set of spool 3 and sleeve 4 in neutral position.

The same elements as in FIG. 1 are denoted with the same reference numerals.

The commutation geometry 7 is basically unchanged. The commutation grooves 12, 13 are partially in overlapping relation with the bores 6 of the housing 2. This overlapping relation changes when the sleeve 4 is rotated in the housing 2. However, this commutation geometry is used to supply and return hydraulic fluid to the measuring motor, more precisely to supply fluid to working chambers having an increasing volume and to return hydraulic fluid from working chambers having a decreasing volume. The commutation geometry has a partition of six like the prior art.

However, the number of throughgoing openings 10, 11 of the spool geometry has been changed.

As can be seen in FIG. 2*a* and FIG. 2*c*, not all commutation grooves 12, 13 are provided with openings 10, 11. At least one commutation groove 13 is provided with an opening 10 and at least one commutation groove 12 is provided with an opening 11. Basically, all other commutation grooves 12, 13 can have a closed bottom. This is possible, since the commutation grooves 12 are connected by the circumferential groove 8 and the commutation grooves 13 are connected by the circumferential groove 9.

However, in order to have a balanced pressure distribution around the set of spool 3 and sleeve 4, it is of advantage to have two or three openings 10 and two or three openings 11 distributed in circumferential direction.

Furthermore, the pressure area P and the cylinder area C have been enlarged in circumferential direction. Adjacent supply areas P and cylinder areas C are separated by sealing areas 14. The sealing areas 14 have a width which is larger than a width of the throughgoing openings 10, 11. However, the width of the sealing area 14 in circumferential direction is smaller than or equal to a width of the commutation grooves 12, 13.

Furthermore, each supply area P comprises a supply groove 15 and each cylinder area C comprises a cylinder groove 16. In a way not shown, the supply grooves 15 can be connected by a circumferential groove on one axial half of the spool 3 which is connected to the above-mentioned supply port. The cylinder grooves 16 can be connected by another circumferential groove on the other axial half of the spool 3 which is connected to the above-mentioned cylinder port.

As can be seen in FIG. 2*c*, a flow resistance in the pressure area P increases from the supply groove 15 to a border 17, 18 of the supply area P in circumferential direction. The same is true for the cylinder area C. A flow resistance increases from the cylinder groove 16 to the border 19, 20 of the cylinder area 16 in circumferential direction.

In the present example this increase of flow resistance (or decrease in the other direction from the border 17, 18 to the supply groove 15 or from the border 19, 20 to the cylinder groove 16, respectively) is realized by decreasing the flow section of the pressure area and of the cylinder area, for example by having an inclined bottom of the pressure area P and the cylinder area C, respectively, from the pressure groove 15 and the cylinder groove 16 to the borders 17, 18; 19, 20, respectively.

However, other ways of varying the flow resistance are possible. The area between the supply groove 15 and the borders 17, 18 can be in form of a triangle (when viewed in a radial direction). The same is true for the cylinder area C. It is also possible to use the radially inner side of the sleeve 4 to form geometries which can vary the flow resistance from the borders 17, 18; 19, 20 to the grooves 15, 16, respectively.

The effect of such a varying flow resistance is that, when the pressure area P comes in overlapping relation with an opening 10 or 11, there is no sudden increase of pressure in the pressure area P. The pressure increases rather slowly the more the spool 3 is rotated in relation to the sleeve 4.

In the way mentioned, it is possible to avoid any connection between the valve geometry and the commutation geometry within the sleeve 3. All connections can be made radially outside of the interior of the spool 3.

When three throughgoing openings 10 and three throughgoing openings 11 are used, the partition angle of the valve geometry is 60°. When only two throughgoing openings 10 and two throughgoing openings 11 are used, the partition angle of the valve geometry is 90°.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A fluid controller comprising a housing having a supply port arrangement, a sleeve arranged rotatably in a bore of the housing, a spool arranged rotatably in the sleeve, and a measuring motor, wherein the measuring motor comprises a plurality of working chambers, each working chamber being connected to the bore, wherein the sleeve comprises a commutation geometry having a number of pairs of commutation grooves and controlling together with a housing geometry of the housing a flow of hydraulic fluid into and out of the working chambers and the spool comprises a spool geometry controlling together with a valve geometry of the sleeve a flow of hydraulic fluid between the supply port arrangement and the commutation geometry, wherein at least one of the commutation grooves comprise a closed bottom and at least one of the commutation grooves comprise a throughgoing opening forming part of the valve geometry, wherein the commutation geometry is connected to a circumferential groove running in a circumferential direction, and wherein the circumferential groove is fluidly connected to the throughgoing opening through the at least one of the commutation grooves comprising the throughgoing opening.

2. The fluid controller according to claim 1, wherein the spool geometry comprises a set of supply areas connected to a supply port of the supply port arrangement and a set of cylinder areas connected to a cylinder port of the housing, wherein a number of the supply areas is equal to a number of the cylinder areas and smaller than the number of the pairs of commutation grooves.

3. The fluid controller according to claim 2, wherein in circumferential direction supply areas and cylinder areas are separated by sealing areas, wherein the width of each sealing area is larger than a width of the throughgoing openings.

4. The fluid controller according to claim 3, wherein in circumferential direction the width of the sealing area is smaller than or equal to a width of the commutation grooves.

5. The fluid controller according to claim 1, wherein the supply area comprises a supply groove connected to the supply port, wherein a flow resistance decreases from a border of the supply area to the supply groove and/or the cylinder area comprises a cylinder groove, wherein a flow resistance increases from the cylinder groove to a border of the supply area.

6. The fluid controller according to claim 5, wherein the supply area and/or the cylinder area comprise a section varying in circumferential direction.

7. The fluid controller according to claim 1, wherein the interior of the sleeve does not form part of a connection between the valve geometry and the commutation geometry.

8. The fluid controller according to claim 1, wherein a partition angle of the commutation geometry is 45° or less.

9. The fluid controller according to claim 1, wherein the partition angle of the valve geometry is 60° or more.

10. The fluid controller according to claim 9, wherein the partition angle of the valve geometry is 90°.

11. The fluid controller according to claim 2, wherein the supply area comprises a supply groove connected to the supply port, wherein a flow resistance decreases from a border of the supply area to the supply groove and/or the cylinder area comprises a cylinder groove, wherein a flow resistance increases from the cylinder groove to a border of the supply area.

12. The fluid controller according to claim 3, wherein the supply area comprises a supply groove connected to the supply port, wherein a flow resistance decreases from a border of the supply area to the supply groove and/or the cylinder area comprises a cylinder groove, wherein a flow resistance increases from the cylinder groove to a border of the supply area.

13. The fluid controller according to claim 4, wherein the supply area comprises a supply groove connected to the supply port, wherein a flow resistance decreases from a border of the supply area to the supply groove and/or the cylinder area comprises a cylinder groove, wherein a flow resistance increases from the cylinder groove to a border of the supply area.

14. The fluid controller according to claim 2, wherein the interior of the sleeve does not form part of a connection between the valve geometry and the commutation geometry.

15. The fluid controller according to claim 3, wherein the interior of the sleeve does not form part of a connection between the valve geometry and the commutation geometry.

16. The fluid controller according to claim 4, wherein the interior of the sleeve does not form part of a connection between the valve geometry and the commutation geometry.

17. The fluid controller according to claim 2, wherein a partition angle of the commutation geometry is 45° or less.

18. The fluid controller according to claim 3, wherein a partition angle of the commutation geometry is 45° or less.

19. A hydraulic steering unit comprising a fluid controller, the fluid controller comprising a housing having a supply port arrangement, a sleeve arranged rotatably in a bore of the housing, a spool arranged rotatably in the sleeve, and a measuring motor, wherein the measuring motor comprises a plurality of working chambers, each working chamber being connected to the bore, wherein the sleeve comprises a commutation geometry having a number of pairs of commutation grooves and controlling together with a housing geometry of the housing a flow of hydraulic fluid into and out of the working chambers and the spool comprises a spool geometry controlling together with a valve geometry of the sleeve a flow of hydraulic fluid between the supply port arrangement and the commutation geometry, wherein at least one of the commutation grooves comprise a closed bottom and at least one of the commutation grooves comprise a throughgoing opening forming part of the valve geometry, wherein the commutation geometry is connected to a circumferential groove running in a circumferential direction, and wherein the circumferential groove is fluidly connected to the throughgoing opening through the at least one of the commutation grooves comprising the throughgoing opening.

20. A fluid controller comprising:
a housing having a supply port arrangement;
a sleeve arranged rotatably in a bore of the housing;
a spool arranged rotatably in the sleeve; and
a measuring motor;
wherein the measuring motor comprises a plurality of working chambers, each working chamber being connected to the bore;

wherein the sleeve comprises a commutation geometry having a number of pairs of commutation grooves and controlling together with a housing geometry of the housing a flow of hydraulic fluid into and out of the working chambers and the spool comprises a spool geometry controlling together with a valve geometry of the sleeve a flow of hydraulic fluid between the supply port arrangement and the commutation geometry;

wherein the commutation grooves comprises a first set of commutation grooves and a second set of commutation grooves;

wherein at least one of the commutation grooves of the first set of the commutation groove comprise a closed bottom and at least one of the commutation grooves of the first set of commutation grooves comprise a first throughgoing opening forming part of the valve geometry;

wherein at least one of the commutation grooves of the second set of the commutation groove comprise a closed bottom and at least one of the commutation grooves of the second set of commutation grooves comprise a second throughgoing opening forming part of the valve geometry;

wherein the commutation geometry is connected to a first circumferential groove running in a circumferential direction and to a second circumferential groove running in the circumferential direction;

wherein the first circumferential groove is fluidly connected to the first throughgoing opening through the at least one of the commutation grooves of the first set of commutation grooves comprising the first throughgoing opening; and wherein the second circumferential groove is fluidly connected to the second throughgoing opening through the at least one of the commutation grooves of the second set of commutation grooves comprising the second throughgoing opening.

\* \* \* \* \*